US011760166B2

(12) United States Patent
Hoppe et al.

(10) Patent No.: US 11,760,166 B2
(45) Date of Patent: Sep. 19, 2023

(54) HEADLINER SYSTEM FOR A MOTOR VEHICLE

(71) Applicant: Kautex Textron GmbH & Co. KG, Bonn (DE)

(72) Inventors: Sebastian Hoppe, Bonn (DE); Milan Karsten, Bonn (DE)

(73) Assignee: Kautex Textron Gmbh & Co. KG, Bonn (DE)

( * ) Notice: Subject to any disclaimer, the term of this patent is extended or adjusted under 35 U.S.C. 154(b) by 0 days.

(21) Appl. No.: 17/802,626

(22) PCT Filed: Mar. 2, 2021

(86) PCT No.: PCT/EP2021/055165
§ 371 (c)(1),
(2) Date: Aug. 26, 2022

(87) PCT Pub. No.: WO2021/175840
PCT Pub. Date: Sep. 10, 2021

(65) Prior Publication Data
US 2023/0108324 A1 Apr. 6, 2023

(30) Foreign Application Priority Data
Mar. 3, 2020 (DE) .......................... 102020105686.9

(51) Int. Cl.
*B60H 1/24* (2006.01)
*B60H 1/00* (2006.01)
*B60H 1/34* (2006.01)

(52) U.S. Cl.
CPC ......... *B60H 1/245* (2013.01); *B60H 1/00564* (2013.01); *B60H 1/3407* (2013.01)

(58) Field of Classification Search
CPC ... B60H 1/245; B60H 1/00564; B60H 1/3407
(Continued)

(56) References Cited

U.S. PATENT DOCUMENTS 2,987,980 A * 6/1961 Winn ..................... B60H 1/262
454/138
4,807,523 A * 2/1989 Radtke ..................... B60S 1/54
296/97.5
(Continued)

FOREIGN PATENT DOCUMENTS

DE 3625681 A1 2/1988
DE 19832738 A 1/2000
(Continued)

OTHER PUBLICATIONS

International Search Report, PCT Application No. PCT/EP2021/055165, dated May 26, 2021 (4 pages).
(Continued)

*Primary Examiner* — Allen R. B. Schult
(74) *Attorney, Agent, or Firm* — Occhiuti & Rohlicek LLP

(57) ABSTRACT

The invention relates to a headliner system for a motor vehicle, said headliner system comprising at least one air supply connection for connecting the headliner system to an air conditioning and ventilation system of the motor vehicle, and at least one outflow device which is fluidically connected to the at least one air supply connection, wherein at least one outflow device has at least two outflow segments, wherein one outflow segment is designed to deliver a designated air volume flow to the passenger compartment, wherein a first outflow segment surrounds a second outflow segment at least in part, and wherein at least one outflow device is designed such that it can be displaced in at least one axis of the outflow device.

13 Claims, 6 Drawing Sheets

(58) Field of Classification Search
USPC .......................................................... 454/137
See application file for complete search history.

(56) References Cited

U.S. PATENT DOCUMENTS

| | | | |
|---|---|---|---|
| 6,932,693 B2* | 8/2005 | Nakagawa | B60H 1/243 |
| | | | 454/137 |
| 11,034,209 B2* | 6/2021 | Cano | B60H 1/00564 |
| 2010/0087130 A1 | 4/2010 | Nitsche et al. | |

FOREIGN PATENT DOCUMENTS

| | | |
|---|---|---|
| DE | 20016667 U1 | 7/2001 |
| DE | 102004005481 A1 | 8/2005 |
| DE | 102015112898 A1 | 2/2017 |
| DE | 102019204961 A1 * | 2/2020 |
| DE | 102019204961 A1 | 2/2020 |
| DE | 102018219076 A1 | 5/2020 |
| DE | 102018222502 A1 | 6/2020 |
| EP | 2676822 A1 | 12/2013 |

OTHER PUBLICATIONS

International Preliminary Report on Patentability, PCT Application No. PCT/EP2021/055165, dated Mar. 28, 2022 (14 pages).

* cited by examiner

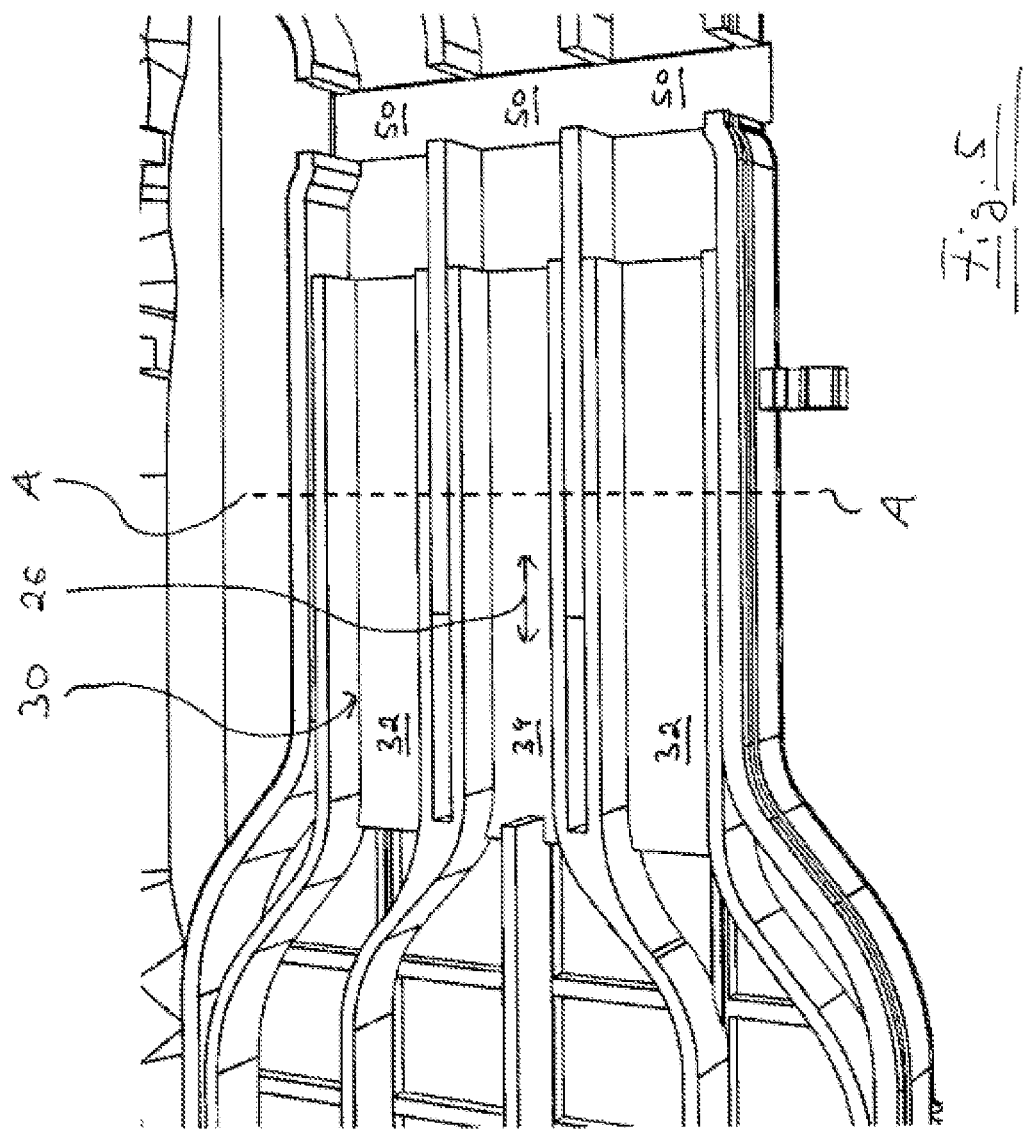

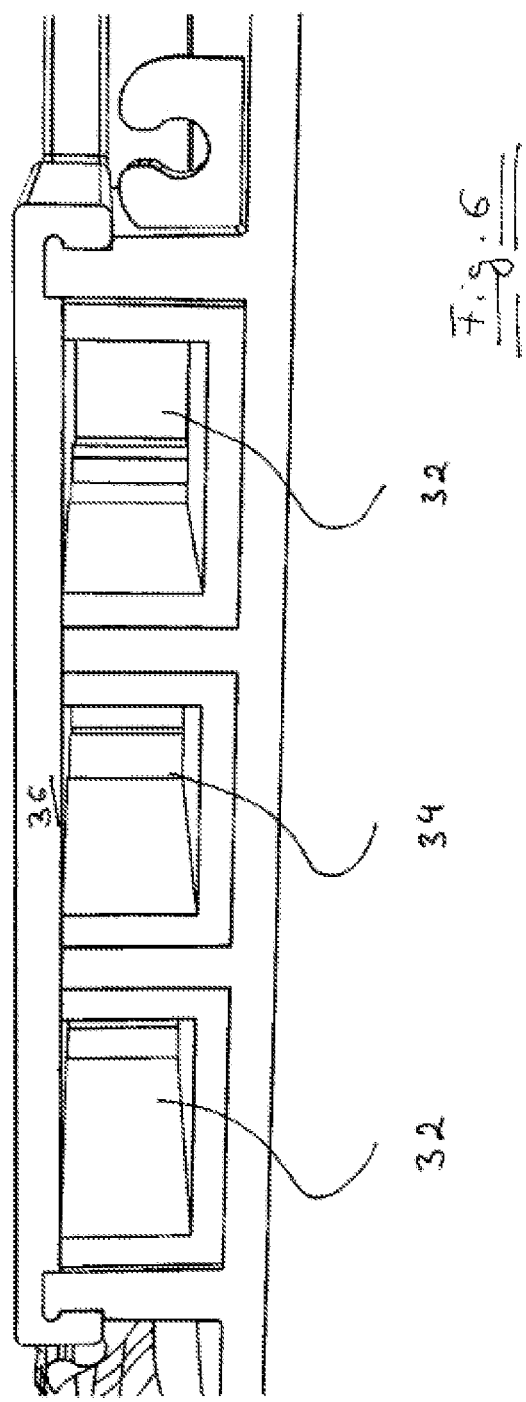

HEADLINER SYSTEM FOR A MOTOR VEHICLE

This application is a 371 National Stage Application of International Application No. PCT/EP2021/055165, filed Mar. 2, 2021, which claims the benefit of the filing date of German Application No. 102020105686.9, filed Mar. 3, 2020, the contents of which are hereby incorporated by reference in their entireties.

The invention relates to a headliner system, to a motor vehicle, and to a method for adjusting an outflow device.

Air conditioning and ventilation systems are intended to bring or keep the air in the vehicle interior in a comfortable temperature, humidity, and speed range. For this purpose, outside air can be filtered on the way into the vehicle interior, mixed with inside air, cooled, heated, accelerated, and directed into the vehicle interior.

The individually perceived thermal comfort of a passenger in a motor vehicle can be increased in particular by the fact that the desired amount of air together with the desired air temperature can interact directly with the individual passenger, without necessarily impairing other passengers in their individual sense of comfort.

With the advent of autonomously operating motor vehicles, there are new possibilities for the interior design of a passenger compartment of a motor vehicle, in particular with regard to a possible variation of the seat position within the passenger compartment. Among other things, it should be considered that the front seats do not always have to be oriented forward when the motor vehicle is used.

This increases the need for greater variability in a climate zone for the individual passenger or a group of passengers, resulting in new requirements for the air conditioning and ventilation system of the motor vehicle. In particular, there is a need to be able to better adapt the region of the air outlet to the seat position of a passenger.

As an additional aspect, the energy efficiency of a motor vehicle is becoming increasingly important, in particular as a result of the development of electromobility. The energy balance also includes ventilation and air conditioning, so that the energy efficiency of the air conditioning and ventilation system also requires constant improvement.

DE 198 32 738 A1 discloses a motor vehicle in which the ceiling of a passenger compartment has an air distribution chamber, the air outlet wall of which extends two-dimensionally in a plane along the surface of the ceiling and adjoins the passenger cabin. The air outlet wall is provided with a plurality of finely distributed openings through which the air supplied to the air distribution chamber from the air supply device enters the passenger cabin with air fronts distributed over a wide surface.

DE 36 25 681 A1 describes an arrangement for ventilating a motor vehicle with an air flow from the windshield through an intermediate space between the vehicle ceiling and a headliner which is provided with air outlet openings. A wall-less air flow channel is provided in a central region of the windshield, which air flow channel is assigned an air outlet nozzle and a confluence funnel. At least part of the intermediate space is designed as a pressure space. With this arrangement, an at least approximately uniform air flow with a low air velocity is obtained for all seats, even at a high air exchange rate. In addition, a higher air movement can be set at each seat without the neighboring seats being disturbed by drafts.

DE 10 2015 112 898 A1 describes an air conditioning and ventilation system for a motor vehicle, having at least one vehicle seat arranged in the vehicle interior, to which vehicle seat at least one ceiling vent system having at least one ceiling vent is assigned. It is provided that the ceiling vent has means that allow the active outflow surface of the ceiling vent to be segmented, with an air supply acting vertically in the vehicle interior being able to be formed with a selection of climate zones in each segment.

The object of the invention is that of providing an improvement over or an alternative to the prior art.

According to a first aspect of the invention, the object is achieved by a headliner system for a motor vehicle, comprising:
  at least one air supply connection for connecting the headliner system to an air conditioning and ventilation system of the motor vehicle; and
  at least one outflow device which is fluidically connected to the at least one air supply connection,
  wherein the headliner system is characterized by the following features:
  at least one outflow device, preferably each outflow device, has at least two outflow segments, wherein one outflow segment is designed to deliver a designated air volume flow to the passenger compartment;
  wherein a first outflow segment surrounds a second outflow segment at least in part; and
  wherein at least one outflow device, preferably each outflow device, is designed such that it can be displaced in at least one axis of the outflow device.

In this regard, the following is explained conceptually:

First of all, it should be expressly pointed out that in the context of the present patent application, indefinite articles and numbers such as "one," "two" etc. should generally be understood as "at least" statements, i.e., as "at least one . . . ," "at least two . . . " etc., unless it is expressly stated from the relevant context or it is obvious or technically imperative to a person skilled in the art that only "exactly one . . . ," "exactly two . . . " etc. can be meant.

In the context of the present patent application, the expression "in particular" should always be understood to introduce an optional, preferred feature. The expression should not be understood to mean "specifically" or "namely."

A "headliner system" is understood to mean a system by means of which air, in particular conditioned air, can be introduced into a passenger cabin of a motor vehicle. The designated air volume flow that can be introduced into the passenger compartment by means of the headliner system is preferably made available to the headliner system by an air conditioning and ventilation system. The headliner system and the air conditioning and ventilation system are at least indirectly fluidically connected to one another in a designated manner via an air supply connection. A headliner system has at least one outflow device, wherein an outflow device has at least two outflow segments, wherein in each case a first outflow segment of an outflow device surrounds a second outflow segment of an outflow device at least in part.

A headliner system preferably has at least two outflow devices, each having at least two outflow segments.

A headliner system preferably has at least three outflow devices, each having at least two outflow segments.

A headliner system preferably has at least four outflow devices, each having at least two outflow segments.

More preferably, the headliner system has a number of outflow devices corresponding to the number of passengers.

The outflow devices are also preferably designed to be structurally identical to one another.

More preferably, the headliner system has further additional outflow devices for the windshield and/or for the rear window and/or for one or more side windows of the motor vehicle.

Each outflow segment of an outflow device, in particular each outflow segment of the headliner system, preferably has a separate air supply channel by means of which it is fluidically connected to the air conditioning and ventilation system of the motor vehicle. The separate air supply channels preferably combine upstream of the outflow segments, preferably before the individual air supply channels meet one or more air supply connections further upstream.

An air supply channel or a plurality of air supply channels preferably run(s) in one or more A pillars of the motor vehicle.

A "motor vehicle" is understood to mean a vehicle driven by a motor. A motor vehicle is preferably not mounted on a rail or at least not permanently track-mounted.

An "air supply connection" is understood to mean an interface by means of which the headliner system can be fluidically connected to the air conditioning and ventilation system of the motor vehicle. The air supply connection can be fluidically connected to the air conditioning and ventilation system of the motor vehicle during assembly of the motor vehicle and preferably offers an interface for separating the headliner system and the air conditioning and ventilation system during maintenance of the system.

In particular, an air supply connection is designed to supply the headliner system with fresh air, in particular temperature-controlled fresh air.

Preferably, a headliner system has at least two air supply connections.

More preferably, a first outflow device is at least indirectly fluidically connected to a first air supply connection. More preferably, a first and a second outflow device are at least indirectly fluidically connected to a first air supply connection. More preferably, a first and a second outflow device are fluidically connected to a first air supply connection, and a third and a fourth outflow device are at least indirectly fluidically connected to a second air supply connection.

"Air conditioning and ventilation system" is understood to mean a system which is designed to bring and/or keep a passenger cabin of a motor vehicle in a comfortable temperature and/or humidity and/or speed range.

An "outflow device" is a component of the headliner system which is designed to allow a designated air volume flow that is preferably provided by the air conditioning and ventilation system to flow into the passenger compartment. An outflow device has at least two outflow segments, each of which is designed to allow a first and/or a second designated partial air volume flow to flow out into the passenger compartment.

An outflow device is preferably designed to guide a designated air volume flow before the designated entry into the passenger compartment.

An outflow device preferably has three or more outflow segments, each outflow segment being designed to introduce a separate designated partial air volume flow into the passenger compartment.

An "outflow segment" is understood to mean a segment of the outflow surface of an outflow device, an outflow segment being characterized in that each outflow segment has a separate air supply for a designated partial air volume flow.

A "fluid volume flow" is understood to mean a physical variable. The fluid volume flow indicates how much volume of a fluid is transported through a specified cross section per period of time.

An "air volume flow" is understood to mean a fluid volume flow for the air medium. A "designated air volume flow" is understood to mean the air volume flow that occurs during the intended use, in particular during the intended use of the headliner system in the proper condition. It goes without saying that the designated air volume flow can have different values depending on the forces acting on it, it also being possible for the designated air volume flow not to be present.

A "passenger compartment" is understood to mean the space in a motor vehicle that is designed to accommodate vehicle occupants.

The passenger compartment is preferably intended to be the interior of a passenger car. The passenger compartment is preferably intended to be the interior of a bus.

A first outflow segment "surrounding" a second outflow segment "at least in part" is understood to mean that the first outflow segment surrounds at least one corner of the second outflow region, with the surrounded corner of the second outflow region having an opening angle of less than 180°.

The surrounded corner of the second outflow region preferably has a well-rounded corner contour, with the polygonal lines adjoining the rounding having an opening angle of less than 180° with respect to one another.

Preferably, a first outflow segment surrounding a second outflow segment at least in part is understood to mean that, in a plan view of the outflow device, the first outflow segment delimits the second outflow segment on at least two, preferably on at least three, sides. In other words, this preferably means that, in a plan view of the outflow device, the first outflow segment surrounds the second outflow segment over an angular range of more than 180°, for example 270°.

Displacement of the outflow device in an "axis" is understood to mean that the outflow device is designed such that it has at least one translatory degree of freedom in one direction and can be displaced within the two end stops that preferably limit the translatory degree of freedom.

The axis is preferably intended to be an axis of symmetry, in particular a longitudinal axis, of the outflow device.

The previously known air conditioning and ventilation concepts are mainly based on air outflow devices in the instrument panel and/or the A pillar and/or the B pillar and/or the cardan tunnel of a motor vehicle.

Deviating from this, a headliner system is proposed which makes it possible to introduce an air volume flow, preferably provided by the air conditioning and ventilation system, into the passenger compartment by means of flat outflow devices in the headliner.

The headliner system proposed herein particularly preferably makes it possible to provide and/or maintain a local air column below an outflow device in the motor vehicle.

It could be shown that an air volume flow introduced from the headliner into the passenger compartment, preferably in the form of a local air column, can increase the thermal comfort of a passenger. In particular, the number, the arrangement, and the size of the outflow devices arranged in the headliner system advantageously make it possible to provide different outflow zones and/or climate zones for different occupants of the motor vehicle. Each person in the motor vehicle is preferably assigned their own outflow device, so that a separate outflow zone and/or climate zone can also be provided for each person in the motor vehicle using the headliner system proposed herein.

By being able to create a local, substantially vertically oriented air column in the motor vehicle, it is also possible to advantageously achieve, with a suitable arrangement and with suitable dimensioning of the outflow device, that local outflow zones and/or climate zones, preferably aligned to the size of a person, can be established, with which zones the individual thermal comfort and/or the energy efficiency in the ventilation and/or air conditioning of the passenger compartment can be improved.

Thus, each outflow device is preferably designed to provide a separate outflow zone and/or climate zone.

Each outflow device or each outflow segment preferably has a separate heating device with which the corresponding designated air volume flow or partial air volume flow can be heated separately. In this way, a separate zone can advantageously be set for each outflow zone and/or climate zone according to the corresponding thermal sense of comfort of the person seated below the outflow device or even according to the thermal sense of comfort of the body regions assigned to the respective outflow segments of the person seated below the outflow device.

The at least one outflow device is preferably designed as a vertical outflow device, such that the partial airflows emerging in a designated manner from the second outflow segment and the at least one first outflow segment are emitted substantially vertically from the headliner into the passenger cabin.

The headliner system preferably has a plurality of outflow devices, a first outflow device being in operative connection with a first person, and a second outflow device being in operative connection with a second person.

The headliner system proposed herein advantageously has a plurality of outflow segments for each outflow device, the first outflow segment being designed to bring a first designated partial air volume flow into an operative connection with the head region of a designated passenger, and/or the second outflow segment being designed to bring a second designated partial air volume flow into an operative connection with the torso and/or the upper limbs of a designated passenger.

The plurality of outflow segments thus allow an increase in a person's thermal comfort. It should be considered in particular that a speed of a partial air volume flow that is in operative connection with the head region of a person is only perceived as comfortable up to a lower speed compared to that in the region of the torso and/or upper limbs of a designated passenger. The different outflow segments can therefore advantageously influence the partial air volume flow that is felt to be comfortable for the different regions of the body, in particular with regard to the corresponding speed and/or the corresponding temperature of the corresponding partial air volume flow.

Furthermore, the different designated partial air volume flows of an outflow device allow the provision of a sufficient cooling capacity and/or heating capacity and/or quantity of fresh air for the provision and maintenance of a ventilation zone and/or climate zone, preferably without exceeding an air speed that is considered uncomfortable in the region of the head.

The headliner system proposed herein preferably consists of an expanded polypropylene at least in part; in particular, the outflow devices can consist of expanded polypropylene, which advantageously saves weight, reduces the manufacturing costs, and increases the recycling rate.

The headliner system proposed herein is advantageously designed such that at least one outflow device, preferably each outflow device, is designed such that it can be displaced in at least one axis of the outflow device, in particular is designed such that it can be displaced individually for each outflow device.

As a result, it can advantageously be achieved that the outflow device can be adapted and/or tracked to the seat position of the person assigned to the relevant outflow device.

In the case of a displacement of the outflow device, a manual displacement or a partially autonomous or fully autonomous displacement of the outflow device by means of a corresponding actuator should be considered in particular.

The axis along which the outflow device can be displaced is preferably a longitudinal axis of the outflow device.

The outflow device can preferably be displaced transversely to the longitudinal axis of the motor vehicle.

The outflow device can preferably be displaced in two axes, as a result of which the flexibility of the headliner system can advantageously be further increased for adaptation to the respective needs.

Preferably, the headliner system is designed in such a way that a displacement movement of an outflow device is or can be coupled to a displacement movement of a seat device. This advantageously allows the outflow device assigned to the seat device to be adjusted manually, semi-autonomously, or autonomously to the relevant seat device, as a result of which the thermal comfort of the person sitting on the seat device can be adapted to the seat position.

The travel path of an outflow device is preferably designed in such a way that it is adjusted to the assumed seat positions of a 5th percentile female and a 95th percentile male.

The headliner system according to the invention has the advantage, among other things, that a passenger cabin of a motor vehicle configured with the headliner system according to the invention can be air-conditioned efficiently, and substantially without drafts, such that passengers in the passenger cabin experience less disturbance.

Furthermore, it has been shown to be advantageous that the headliner system proposed herein allows particularly low-noise ventilation and air conditioning of the passenger compartment.

A further advantage of the headliner system according to the invention is its simple structure, such that the headliner system according to the invention can be produced inexpensively and has better recycling properties.

In particular, the headliner system proposed herein allows a simple and cost-effective solution for adapting the position of the outflow surface of the outflow device to the seat position.

At least one outflow device, preferably each outflow device, is preferably designed such that it can be displaced in the direction of the longitudinal axis of the motor vehicle.

In this regard, the following is explained conceptually:

The "longitudinal axis of the motor vehicle" is understood to mean the axis of the motor vehicle that points forward.

In this way, a simple and equally effective adjustment of the outflow region of the outflow device to the seat position of the at least one person assigned in each case can advantageously be achieved. In particular, displaceability in the direction of the longitudinal axis of the motor vehicle is particularly effective, since most seat devices designed in motor vehicles can also be displaced in the longitudinal direction of the motor vehicle.

The direction of the longitudinal axis of the motor vehicle is preferably understood to mean a direction in a plane parallel to the roadway of the motor vehicle, so that the direction of the longitudinal axis is to be understood as a two-dimensional direction.

According to a particularly expedient embodiment, at least one outflow device, preferably each outflow device, is designed such that it can be displaced in the direction of a displacement direction of a seat device.

In this regard, the following is explained conceptually:

A "displacement direction" is understood to mean the direction in which a component or an assembly can be displaced, in particular an outflow device and/or a seat device can be displaced.

A "seat device" is understood to mean an apparatus which is designed such that at least one occupant of a motor vehicle can sit down on it and be transported on it while seated.

A seat device is preferably understood to mean a single seat, in particular a driver's seat and/or a passenger seat.

A seat device is preferably understood to mean a bench seat which offers seating for more than one person, in particular a back seat of a motor vehicle.

It is proposed herein that an outflow region of an outflow device can be displaced directly in the displacement direction of a seat device, so that advantageously only one adjustment parameter has to be taken into account when adjusting to the position of the seat device.

The displacement direction is preferably understood to mean a direction in a plane parallel to the roadway of the motor vehicle, so that the displacement direction is to be understood as a two-dimensional direction.

According to a particularly preferred embodiment, the headliner system has a length-variable air duct device between the at least one air supply connection and the at least one outflow device, the length-variable air duct device being designed to be passed through by a designated air volume flow.

In this regard, the following is explained conceptually:

A "length-variable air duct device" is understood to mean an air duct device that can change its length without the tightness of the air duct device changing significantly on the piece in which a designated air volume flow is guided, in particular without said tightness changing at all. The length-variable air guiding device is designed in particular to compensate for a geometric change in the air supply of the outflow device resulting from the displacement of an outflow device by varying the length of the air duct device.

A length-variable air duct device is preferably a flexible pipe.

A length-variable air duct device preferably has a first segment and at least one second segment, the segments being designed, comparable to a telescopic tube, to be inserted into one another or to have been inserted into one another. Preferably, the segments have a sealant between the segments.

The headliner system preferably has a separate length-variable air duct device for each outflow device.

The length-variable air duct device proposed herein advantageously allows compensation of the air duct route to the respective outflow segments of an outflow device that can be displaced between the air supply connection and the outflow device.

Optionally, the length-variable air duct device has at least two air duct channels through which air can flow freely, a first air duct channel through which air can flow freely being fluidically connected to the first outflow segment, and a second air duct channel through which air can flow freely being fluidically connected to the second outflow segment.

In this regard, the following is explained conceptually:

An "air duct channel through which air can flow freely" is understood to mean a permeable channel through which air can flow freely, which channel is formed by side walls. The course of a channel is irrelevant in this case.

Accordingly, a length-variable air duct device preferably has a plurality of air duct channels, each of which is designed to guide a designated partial air volume flow.

In particular, a separate air supply channel can be provided in the length-variable air duct device for each outflow segment, so that the designated partial air volume flows can advantageously be guided to the respective outflow segments independently of one another.

According to an expedient embodiment, the headliner system has at least one outflow grille with a grid.

In this regard, the following is explained conceptually:

An "outflow grille" is understood to mean an arrangement of components or component portions extending in the longitudinal direction, which are designed to be passed through by a designated air volume flow during its designated entry into the passenger compartment.

A "grid" is understood to mean an arrangement of the components or component portions of an outflow grille that extend in the longitudinal direction.

The grid of an outflow grille is preferably arranged in uniform portions at least in one spatial direction along the longitudinal extent of the components or component portions of an outflow grille that extend in the longitudinal direction.

The grid of an outflow grille is preferably arranged in uniform portions in two spatial directions along the longitudinal extent of the components or component portions of an outflow grille that extend in the longitudinal direction.

The outflow grille proposed herein advantageously improves the alignment, in particular the vertical alignment, of the designated air volume flow as it flows through the outflow grille.

Furthermore, the outflow grille is preferably advantageously designed so that a designated partial air volume flow from one outflow segment does not flow into a different outflow segment.

Optionally, the grid of at least one outflow grille has varying distances, in particular varying distances in the direction of the displacement direction of an outflow device.

In this regard, the following is explained conceptually:

"Varying distances" of the grid of an outflow grid are understood to mean that the grid of an outflow grille is preferably arranged in non-uniform portions at least in one spatial direction along the longitudinal extent of the components or component portions of an outflow grille that extend in the longitudinal direction.

Due to the variable distances proposed herein, the gradation of the adjustment range of the outflow device can be adapted to the given requirements. In particular, in the central adjustment range, which is associated with the highest probability of use because of the statistical distribution of the different body sizes, the gradation of the adjustment range can be designed to be more finely graded.

The headliner system is particularly preferably designed in such a way that the displacement movement of an outflow device is coupled stepwise to the grid of the outflow grille of the outflow device.

In this regard, the following is explained conceptually:

"Stepwise" is understood to mean that the displacement movement of an outflow device can only take place in steps at discrete points in the displacement range of the outflow device.

A displacement movement "coupled" to the grid of the outflow grille is understood to mean that the discrete points in the displacement range of the outflow device are coupled to the grid of the outflow grille, so that the outflow device can only be displaced in accordance with the relevant corresponding distance of the grid of the outflow grille from the adjacent step. Preferably, the outflow device can be displaced simultaneously over a plurality of discrete steps of the grid of the outflow grille in one displacement movement.

The gradation can advantageously be achieved in that the sealing effect of the outflow grille can be improved, which can improve the fact that a designated partial air volume flow from an outflow segment does not flow into a deviating outflow segment.

The outflow grille can also have a seal between the outflow grille and the individual outflow segments of the outflow device.

In addition, the outflow grille can reduce the turbulence between the at least two partial air volume flows at the boundary surfaces of the partial air volume flows.

The headliner system particularly expediently has an actuator, the actuator being designed to displace an outflow device.

In this regard, the following is explained conceptually:

An "actuator" is understood to mean a technical drive unit that is designed to convert an electrical signal into a mechanical movement.

By means of the actuator, it is made possible that the outflow device advantageously does not need to be manually adjusted.

Furthermore, the actuator can allow a semi-autonomous or autonomous adjustment of the outflow device, in particular as a function of an adjustment movement of a seat device.

The actuator is preferably formed by an electric motor in combination with a toothed rack, the toothed rack preferably being connected to the length-variable air duct device.

According to a particularly preferred embodiment, the second outflow segment forms a central outflow region, and the first outflow segment forms a peripheral outflow region.

In this regard, the following is explained conceptually:

A "central outflow region" is understood to mean an outflow segment of an outflow device which is surrounded by a peripheral outflow region at least in part.

A central outflow region is preferably understood to mean the region of an outflow device, which is arranged substantially in the center point of the outflow device. The central flow region is preferably substantially surrounded by at least one peripheral outflow region, preferably by at least two peripheral outflow regions.

A central outflow region is preferably formed by the second outflow segment.

A "peripheral outflow region" is understood to mean an outflow segment of an outflow device which surrounds a central outflow region at least in part.

In a plan view of an outflow device, a peripheral outflow region preferably has a greater eccentricity than a central outflow region associated with the outflow device.

A peripheral outflow region is preferably formed at least by the one first outflow segment.

Each outflow device preferably has a central outflow region and a peripheral outflow region, each of which has at least one separate air supply channel. Consequently, the central outflow region has a central air supply channel, and the peripheral outflow region has at least one peripheral air supply channel.

The central outflow region is preferably designed as at least one outlet opening of the headliner system. The same applies to the peripheral outflow region, which is also designed as at least one additional outlet opening of the headliner system.

Because the peripheral outflow region surrounds the central outflow region at least in part, the designated partial air volume flow emerging from the peripheral outflow region surrounds, at least in part, the designated partial air volume flow emerging from the central outflow region. The designated partial air volume flow emerging from the peripheral outflow region surrounds the designated partial air volume flow emerging from the central outflow region in the form of a cocoon. This approach achieves a precisely targeted exposure for the passenger to an air volume flow emerging from the headliner system.

The peripheral outflow region preferably surrounds the central outflow region in such a way that a straight first axis runs through the peripheral outflow region twice in a first direction of extension of the outflow device, and through the central outflow region once, wherein a second straight axis which runs perpendicularly to the first axis runs through the peripheral outflow region and the central outflow region in each case once in a second direction of extension of the outflow device which is oriented perpendicularly to the first direction of extension of the outflow device.

More preferably, the peripheral outflow region is U-shaped or V-shaped in plan view of the peripheral outflow region.

The headliner system is preferably designed in such a way that the peripheral outflow region or the peripheral outflow regions of the respective outflow devices has or have at least two peripheral outflow zones, each of which has a separate air supply channel, wherein the at least two peripheral outflow zones together surround the central outflow region at least in part.

According to a preferred embodiment, the headliner system has at least two flow actuators, at least one first flow actuator being assigned to the first outflow segment, and at least one second flow actuator being assigned to the second outflow segment.

In this regard, the following is explained conceptually:

A "flow actuator" is understood to mean a component or an assembly, which is designed to control the flow of a designated fluid volume flow, in particular designed to control a designated air volume flow.

Preferably, a flow actuator is designed to control a designated fluid volume flow in a predetermined range of the fluid volume flow, preferably in a range between an initial value and an end value.

Preferably, a flow actuator is designed to reduce a designated fluid volume flow in such a way that the designated fluid volume flow can come to a complete standstill.

A headliner system is proposed herein in which each outflow device has at least two flow actuators, at least one second flow actuator being assigned to the second outflow segment or to the central outflow region and at least one first flow actuator being assigned to the first outflow segment or to the peripheral outflow region, wherein the at least one second flow actuator is preferably arranged in the at least one air supply channel of the central outflow region or of the second outflow segment and the at least one first flow actuator is arranged in the at least one air supply channel of the peripheral outflow region or of the first outflow segment, wherein the peripheral outflow region surrounds the central outflow region at least in part.

Each flow actuator is designed to control a partial air volume flow assigned to the outflow segment assigned to the flow actuator. The respective flow actuators are preferably designed as flow valves which can each be rotated about an axis of rotation between their closed position and their open position. The respective flow actuators are preferably continuously adjustable between their closed position and their open position.

The headliner system is preferably designed in such a way that the respective flow actuators are adjustable independently of each other between a closed position in which the air supply channel in which the flow actuator is arranged is closed by means of the flow actuator, and an open position in which the air supply channel in which the flow actuator is arranged is permeable to air.

The correspondingly designed headliner system has the advantage that the air outflow from the central outflow region and the peripheral outflow region of each outflow device can be adjusted in such a way that different body regions of a passenger who is seated below an outflow device can be exposed to different amounts of air from the central outflow region and from the peripheral outflow region.

According to a second aspect of the invention, the object is achieved by a motor vehicle having an air conditioning and ventilation system for air conditioning and/or ventilating a passenger compartment of the motor vehicle, the motor vehicle having a headliner system according to the first aspect of the invention, wherein the at least one air supply connection of the headliner system is connected to the air conditioning and ventilation system, such that a designated air volume flow provided by the air conditioning and ventilation system can be introduced into the passenger compartment of the motor vehicle via the at least one outflow device of the headliner system.

In this regard, the following is explained conceptually:

"Air conditioning" is understood to mean maintaining and generating a comfortable or required indoor air quality regardless of the weather, waste heat, or human emissions. The room air quality is preferably understood to mean the temperature and/or the humidity and/or the purity of the air.

"Ventilating" is understood to mean the supply of outside air into the passenger compartment. "Ventilating" is preferably understood to mean the exchange of air in the passenger compartment.

It goes without saying that the advantages of a headliner system, in particular a headliner system according to the first aspect of the invention, as described above, directly apply to a motor vehicle having an air conditioning and ventilation system for air conditioning and/or ventilating a passenger compartment of the motor vehicle, the motor vehicle having a headliner system according to the first aspect of the invention, wherein the at least one air supply connection of the headliner system is connected to the air conditioning and ventilation system, such that air provided by the air conditioning and ventilation system can be introduced into the passenger compartment of the motor vehicle via the at least one outflow device of the headliner system.

It should be expressly noted that the subject matter of the second aspect can advantageously be combined with the subject matter of the preceding aspect of the invention, both individually or cumulatively in any combination.

According to a third aspect of the invention, the object is achieved by a method for adjusting an outflow device of a headliner system, in particular a headliner system according to the first aspect of the invention, wherein a displacement movement of an outflow device is coupled to a displacement movement of a seat device.

Preferably, it can be provided that the position of the seat device is detected by a sensor and that the outflow device can be adjusted autonomously or partially autonomously depending on the value detected by the associated sensor.

Furthermore, in the case of an electrically adjustable seat device, provision can be made for a coupled adjustment of the outflow device to take place simultaneously or with a time delay when the seat device is adjusted.

It goes without saying that the advantages of a headliner system, in particular a headliner system according to the first aspect of the invention, as described above, directly apply to a method for adjusting an outflow device of a headliner system, in particular a headliner system according to the first aspect of the invention, a displacement movement of an outflow device being coupled to a displacement movement of a seat device.

It should be expressly noted that the subject matter of the third aspect can advantageously be combined with the subject matter of the preceding aspects of the invention, both individually or cumulatively in any combination.

Further advantages, details, and features of the invention can be found below in the described embodiments. In the drawings, in detail:

FIG. 5 is a schematic perspective view of a length-variable air duct device, the length-variable air duct device having the section A; and FIG. 6 is a schematic perspective view of the section A.

In the following description, the same reference signs denote the same components or features; in the interest of avoiding repetition, a description of a component made with reference to one drawing also applies to the other drawings. Furthermore, individual features that have been described in connection with one embodiment can also be used separately in other embodiments.

Figure 1:
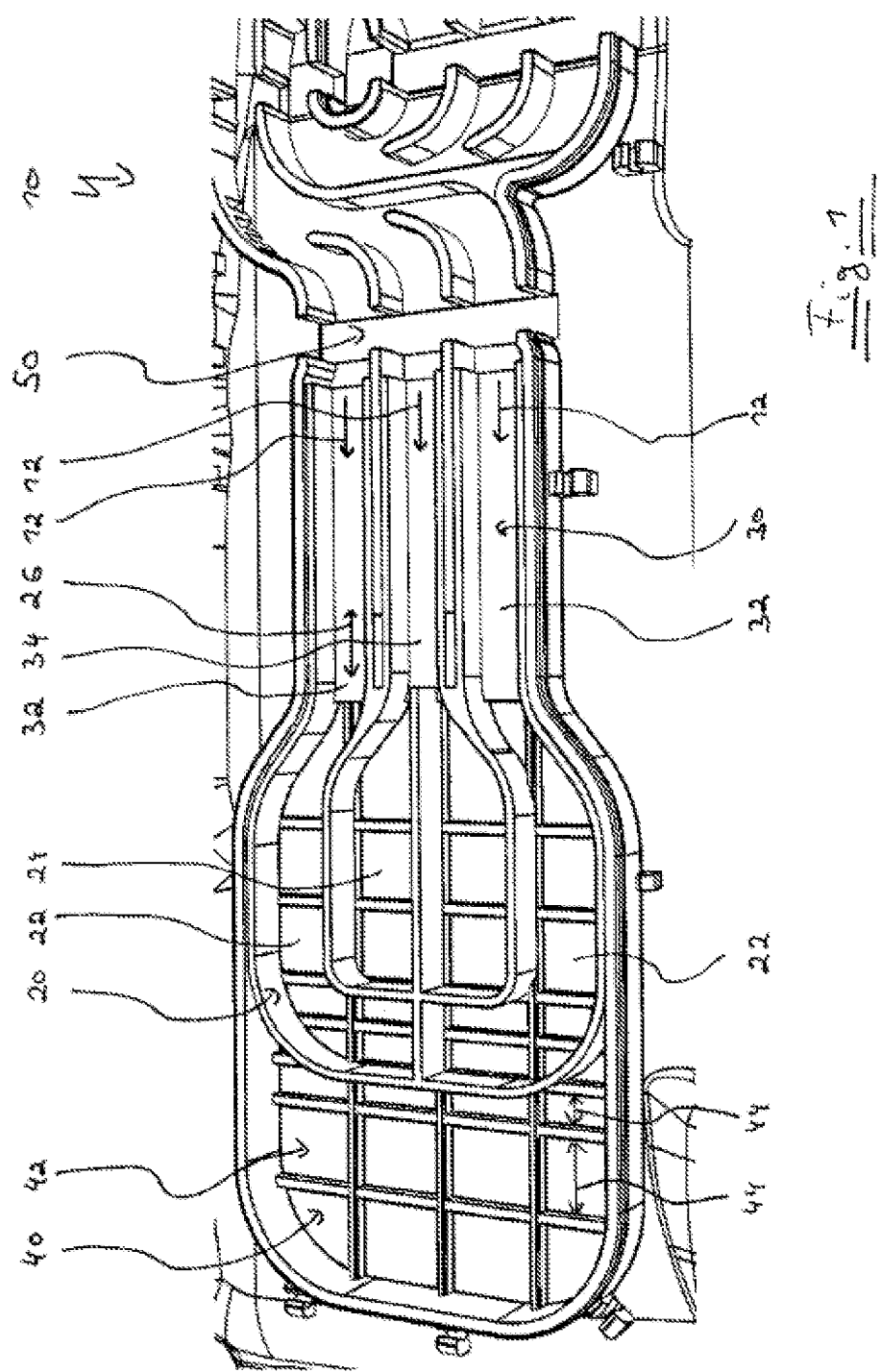
FIG. 1 is a schematic, perspective view of a region of a headliner system according to the invention in a first displacement position, the headliner system being shown in such a way that a side of the headliner system facing away from the passenger cabin is shown.
Figure 2:
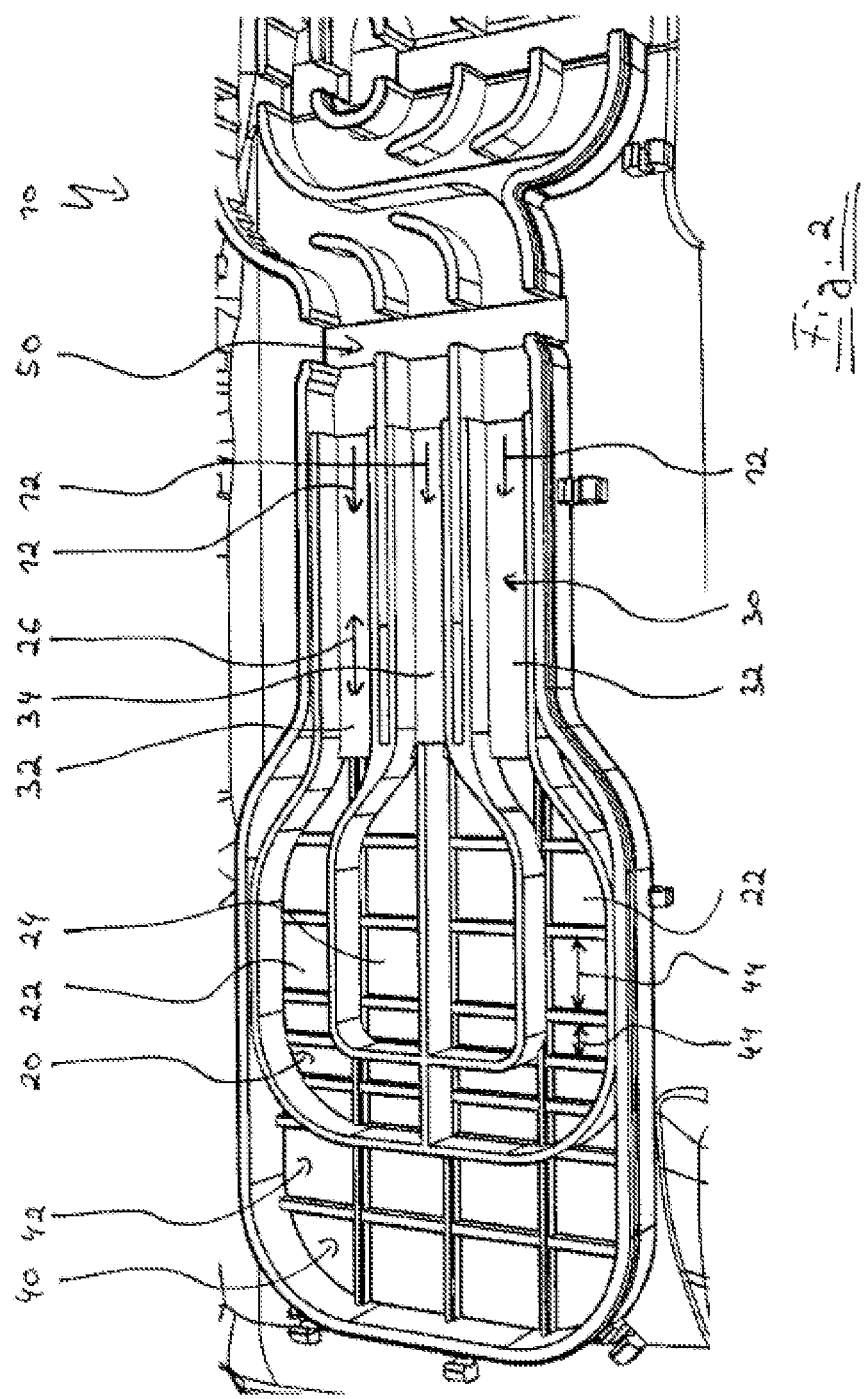
FIG. 2 is a schematic, perspective view of a region of a headliner system according to the invention in a second displacement position, the headliner system being shown in such a way that a side of the headliner system facing away from the passenger cabin is shown.
Figure 3:
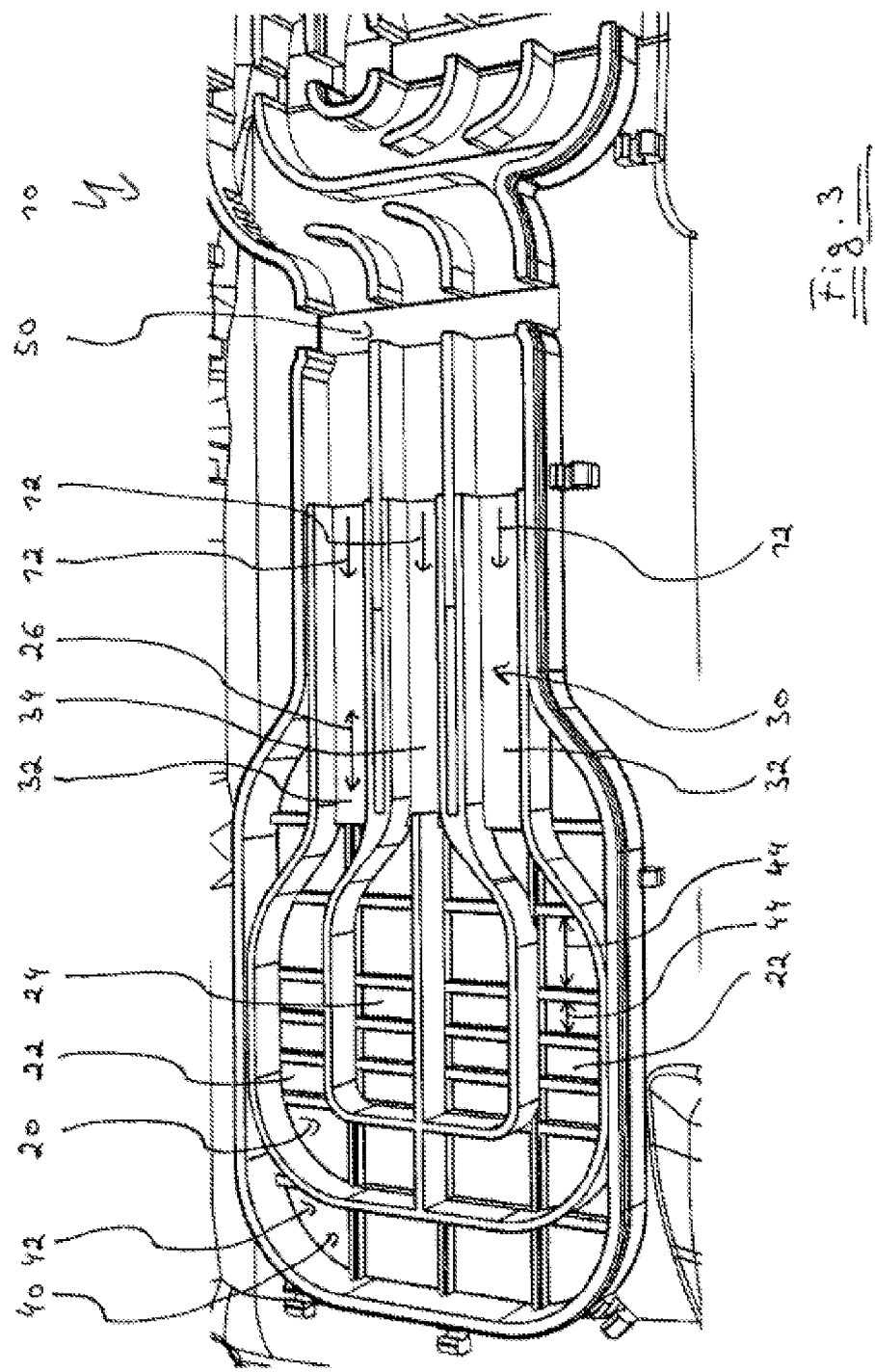
FIG. 3 is a schematic, perspective view of a region of a headliner system according to the invention in a third displacement position, the headliner system being shown in such a way that a side of the headliner system facing away from the passenger cabin is shown.
Figure 4:
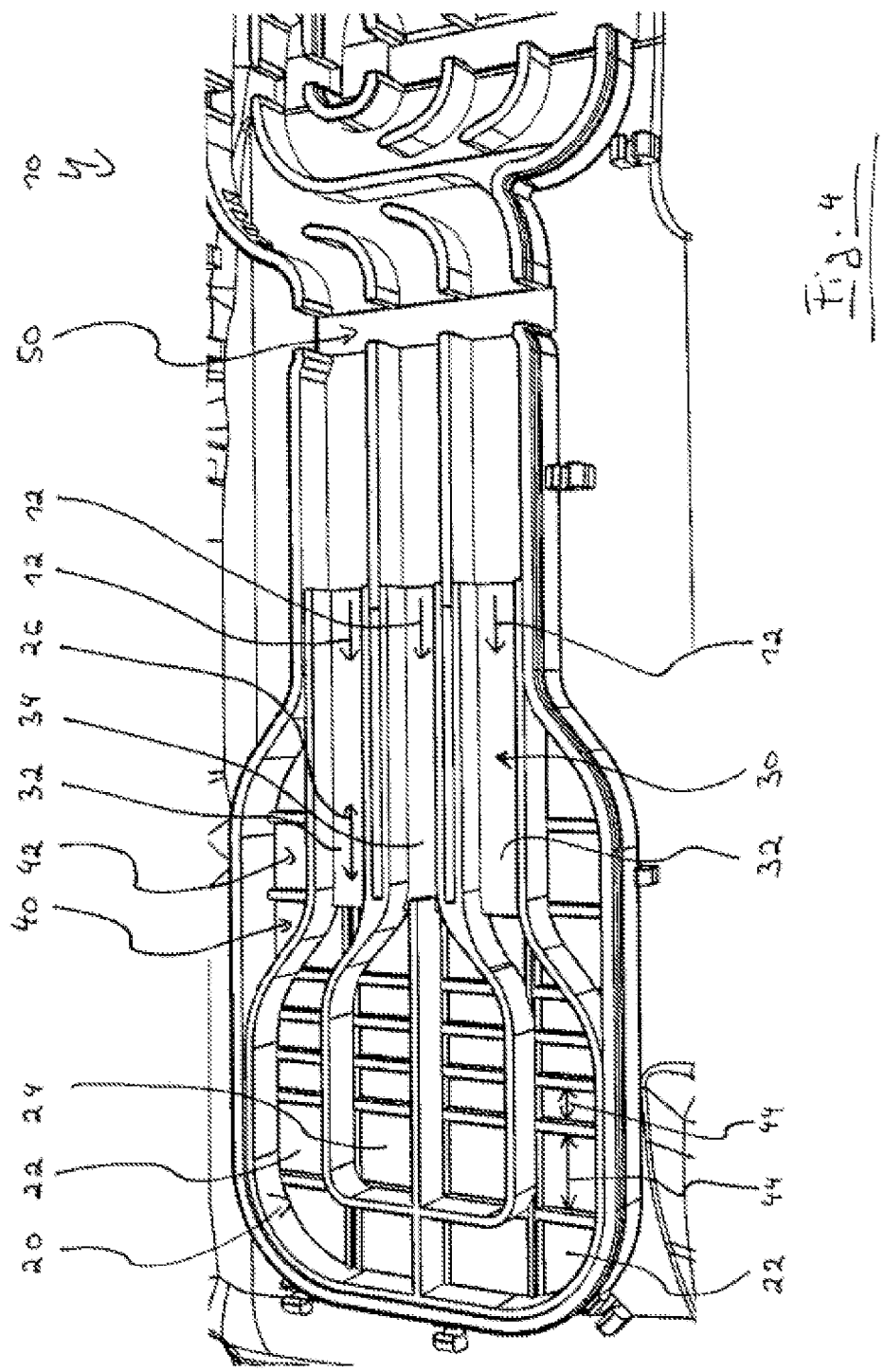
FIG. 4 is a schematic, perspective view of a region of a headliner system according to the invention in a fourth displacement position, the headliner system being shown in such a way that a side of the headliner system facing away from the passenger cabin is shown.

FIGS. 1, 2, 3, and 4 show a headliner system 10 according to the invention, a side of the headliner system 10 facing away from a passenger cabin (not shown) being shown in each case.

The headliner system 10 according to the invention consists substantially of an air supply connection (not shown), an outflow device 20, a length-variable air duct device 30, and an outflow grille 40.

In addition, the headliner system 10 according to the invention has space for flow actuators 50.

The different FIGS. 1, 2, 3, and 4 show the headliner system 10 according to the invention with in each case different displacement positions (not denoted) of the outflow device 20, which can be displaced in an axis 26 of the outflow device 20.

The headliner system can be connected to an air conditioning and ventilation system (not shown) of a motor vehicle (not shown) via the air supply connection (not shown), which can provide a designated air volume flow 12 to the headliner system 10. The headliner system 10 is designed to forward the designated air volume flow 12 to the passenger compartment (not shown) in an advantageous manner, so that a substantially vertical air column (not shown) is established or maintained in the passenger cabin (not shown).

The different displacement positions (not denoted) of the outflow device 20 make it possible to adjust the position of the outflow device 20 to the position of the seat device (not shown), so that a thermally comfortable climate zone (not shown) and/or ventilation zone (not shown) can advantageously be achieved for the person (not shown) sitting in a designated manner on the seat device (not shown).

The outflow device 20 has two first outflow segments 22 and a second outflow segment 24, with the first outflow segment 22 forming an edge flow region and the second outflow segment 24 forming a central flow region. The first outflow segments 22 surround the second outflow segment 24 at least in part.

The outflow grid 40 also has a grid 42 with varying distances 44, the outflow device 20 being designed to be displaced along the axis 26 corresponding to the grid 42 of the outflow grille 40, as shown in FIGS. 1, 2, 3, and 4.

Furthermore, the headliner system 10 has the length-variable air duct device 30 which has a separate air duct channel 32, 34 for each outflow segment 22, 24, the separate air duct channel 32, 34 being variable in length, so that the displacement of the outflow device 20 by means of the length-variable air duct device 30 can be compensated for.

In addition, the headliner system 10 has space for flow actuators 50, which allows the installation of flow actuators (not shown). The flow actuators allow regulation of the designated air flow rates 12, so that a thermally comfortable climate zone can be set, the climate zone consisting of a vertical designated air volume flow (not shown) emerging in a designated manner from the second outflow segment 24 and of a vertical designated air volume flow (not shown) emerging in a designated manner from the first outflow segment 22, according to the individual needs and/or the individual thermal comfort of the person (not shown) assigned to the outflow device 20.

The headliner system 10 preferably has two, three, four, or more outflow devices 20 which—if displaceable—can each be connected to the air conditioning and ventilation system (not shown) of the motor vehicle (not shown) by means of a length-variable air duct device 30 and the air supply connection (not shown).

The outflow device 20 can preferably be connected by means of an actuator (not shown).

The outflow device 20 can be displaced between the geometrically determined end stops (not denoted).

The length-variable air duct device 30 in FIG. 5 has a section A.

The length-variable air duct device 30 shown in the section A in FIG. 6 has a cover 36 that closes the length-variable air duct device 30 and is designed to ensure that the designated air volume flow (not shown) does not escape from the length-variable air duct device 30.

The length-variable air duct device 30 is preferably mounted in a groove (not denoted) in the cover 36, with two webs (not denoted) in each case forming an air duct channel 32, 34 in each case.

LIST OF REFERENCE SIGNS

10 Headliner system
12 Designated air volume flow
20 Outflow device
22 First outflow segment
24 Second outflow segment
26 Axis/displacement direction
30 Length-variable air duct device
32 First air duct channel through which air can flow freely
34 Second air duct channel through which air can flow freely
36 Cover
40 Outflow grille
42 Grid
44 Varying distances
50 Installation space for flow actuators
A Section

The invention claimed is:

1. A headliner system for a motor vehicle, said headliner system comprising:
at least one air supply connection for connecting the headliner system to an air conditioning and ventilation system of the motor vehicle and
at least one outflow device, which is fluidically connected to the at least one air supply connection,
wherein the at least one outflow device has at least two outflow segments, wherein one outflow segment is designed to deliver a designated air volume flow to a passenger compartment;
wherein the at least two outflow segments each have a separate air supply for a separate designated partial air volume flow,
wherein a first outflow segment of the at least two outflow segments surrounds a second outflow segment of the at least two outflow segments at least in part; and
wherein the at least one outflow device is designed such that the at least one outflow device can be displaced in at least one axis of the outflow device, such that the first outflow segment and the second outflow segment are jointly displaced.

2. The headliner system according to claim 1, wherein the at least one outflow device is designed such that the at least one outflow device can be displaced in a direction of a longitudinal axis of the motor vehicle.

3. The headliner system according to claim 1 wherein the at least one outflow device is designed such that the at least one outflow device can be displaced in a direction of a displacement direction of a seat device.

4. The headliner system according to claim 1, wherein the headliner system has a length-variable air duct device between the at least one air supply connection and the at least one outflow device, the length-variable air duct device being designed to be passed through by a designated air volume flow.

5. The headliner system according to claim 4, wherein the length-variable air duct device has at least two air duct channels through which air can flow freely, a first air duct channel through which air can flow freely being fluidically connected to the first outflow segment, and a second air duct channel through which air can flow freely being fluidically connected to the second outflow segment.

6. The headliner system according to claim 1, wherein the headliner system has at least one outflow grille with a grid.

7. The headliner system according to claim 6, wherein the grid of the at least one outflow grille has varying distances, in particular varying distances in a direction of a displacement direction of the at least one outflow device.

8. The headliner system according to claim 1, wherein the headliner system is designed in such a way that the displacement movement of the at least one outflow device is coupled stepwise to a grid of an outflow grille of the headliner system.

9. The headliner system according to claim 1, wherein the headliner system has an actuator, the actuator being designed to displace the at least one outflow device.

10. The headliner system according to claim 1, wherein the second outflow segment forms a central outflow region and the first outflow segment forms a peripheral outflow region.

11. The headliner system according to claim 1, wherein the headliner system has at least two flow actuators, at least one first flow actuator being assigned to the first outflow segment, and at least one second flow actuator being assigned to the second outflow segment.

12. A motor vehicle having an air conditioning and ventilation system for air conditioning and/or ventilating a passenger compartment of the motor vehicle, the motor vehicle being characterized in that the motor vehicle has a headliner system according to claim 1, the at least one air supply connection of the headliner system being connected to the air conditioning and ventilation system, such that a designated air volume flow provided by the air conditioning and ventilation system can be introduced into the passenger compartment of the motor vehicle via the at least one outflow device of the headliner system.

13. A method for adjusting an outflow device of a headliner system according to claim 1, wherein a displacement movement of the at least one outflow device is coupled to a displacement movement of a seat device of the motor vehicle.

* * * * *